United States Patent [19]
Winings

[11] 3,961,465
[45] June 8, 1976

[54] VACUUM HARVESTING MACHINE

[76] Inventor: LeRoy Winings, 208 E. Third St., Harristown, Ill. 62537

[22] Filed: Dec. 4, 1974

[21] Appl. No.: 529,353

[52] U.S. Cl.................................. 56/13.1; 56/14.6; 56/16.5; 56/126; 56/DIG. 8
[51] Int. Cl.².......................................... A01D 45/22
[58] Field of Search................... 56/12.8, 12.9, 13.1, 56/14.1–14.6, 16.4–16.6, 126–130, DIG. 8; 130/27 Y

[56] References Cited
UNITED STATES PATENTS

| | | | |
|---|---|---|---|
| 2,328,713 | 9/1943 | Dowd et al. | 56/DIG. 8 |
| 2,485,713 | 10/1949 | Dowd | 56/DIG. 8 |
| 3,125,843 | 3/1964 | Nodini | 56/13.1 |

Primary Examiner—Louis G. Mancene
Assistant Examiner—J. N. Eskovitz
Attorney, Agent, or Firm—Wegner, Stellman, McCord, Wiles & Wood

[57] ABSTRACT

In an apparatus for increasing the yield of beans or grain wherein a primary harvesting machine or header is mounted forward of the combine with a secondary harvesting device located immediately to the rear of the primary harvester. The secondary harvesting device is vacuum operated to pick up beans or grain knocked to the ground under the primary harvester. The vacuumed up beans or grain are fed into the onboard chaffer and separator mechanism of the combine for cleaning and combining with the beans or grain picked up by the primary harvester.

9 Claims, 5 Drawing Figures

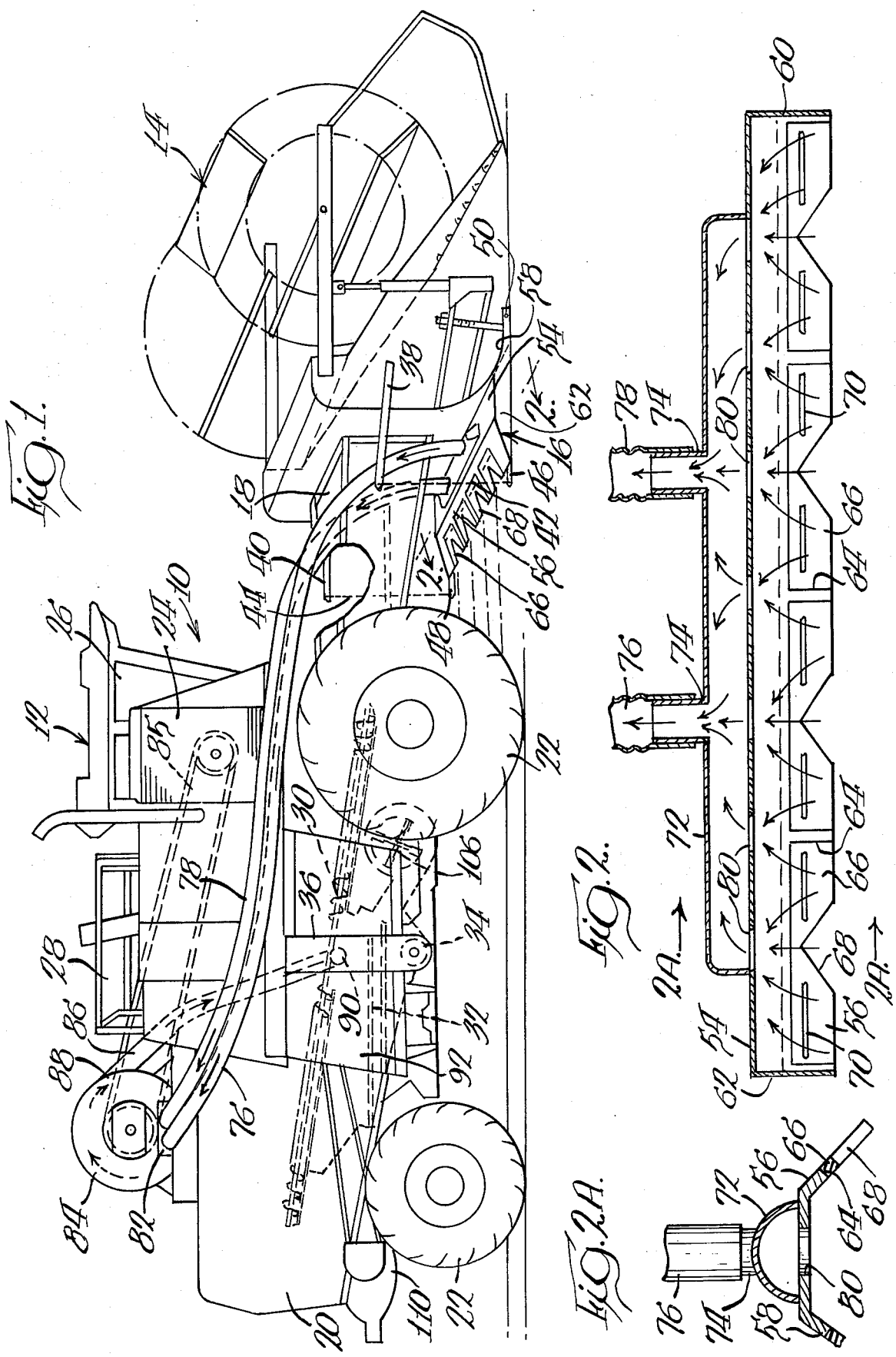

VACUUM HARVESTING MACHINE

BACKGROUND OF THE INVENTION

1. Field of the Invention

This invention relates to a harvesting machine and, more particularly, to a vacuuming machine in conjunction with a conventional harvester for increasing the yield from a field.

2. Description of the Prior Art

Relatively efficient machines have been designed and built for use on the front, side or rear of a tractor for extracting as much beans or grain (nuts, cotton and the like) from every planted acre as is possible. Unfortunately, the machines were designed with certain growth and orientation of the plants in mind. That is, the stalks or stems must be reasonably straight with the beans or grain, etc. at a certain height above the ground. Also entering into the picture is the dryness or wetness of the plants, for if the plants are dry, the slightest bump or sudden shaking will pop the pods and scatter the contents onto the ground. If the grain stalks are angled or if the beans or grain are close to the ground, the harvester will knock them off leaving the beans or grain on the ground.

Certain equipment has been provided in the past for the suctioning up of nuts. Also, in the cotton-picking area, a harvester has been designed which first picks as many bolls as is feasible and then a suctioning device is provided for picking the rest of the cotton including that which has been knocked to the ground.

None of these prior art devices were very effective or efficient especially when applied to soybean or grain harvesting where the dropped beans or grain are more randomly scattered, are lighter and smaller than nuts and are heavier and smaller than bolls of cotton.

SUMMARY OF THE INVENTION

A self-propelled combine has a soybean or grain harvesting cutting platform projecting forward of the combine for cutting and initially separating the beans or grain from the stalks with conveying means for moving the beans or grain, stalks, chaff and the like, into the combine for separating the beans or grain from the stalks and debris. In my invention, the cutting platform, which will be called the primary harvesting mechanism, is positioned forward of the combine with a vacuuming hood suspended between the primary harvesting mechanism and the combine and close to the ground. The vacuuming hood, which will be called the secondary harvesting mechanism, draws up the beans or grain that are knocked to the ground by the harvesting mechanism. The drawn up beans or grain, together with much loose debris, are propelled into the combine where the beans or grain are air separated from the debris as the beans or grain join the stream of beans or grain from the primary harvesting mechanism. The clean beans or grain are conveyed to a storage hopper from where they are transferred to trucks and subsequently to storage.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational perspective view of a combine having a harvesting cutting platform and my improved vacuuming device;

FIG. 2 is a cross-sectional view of my vacuuming device taken along the line 2—2 of FIG. 1;

FIG. 2A is a cross-sectional view taken along the line 2A—2A of FIG. 2;

DESCRIPTION OF THE PREFERRED EMBODIMENT

Figure 3:
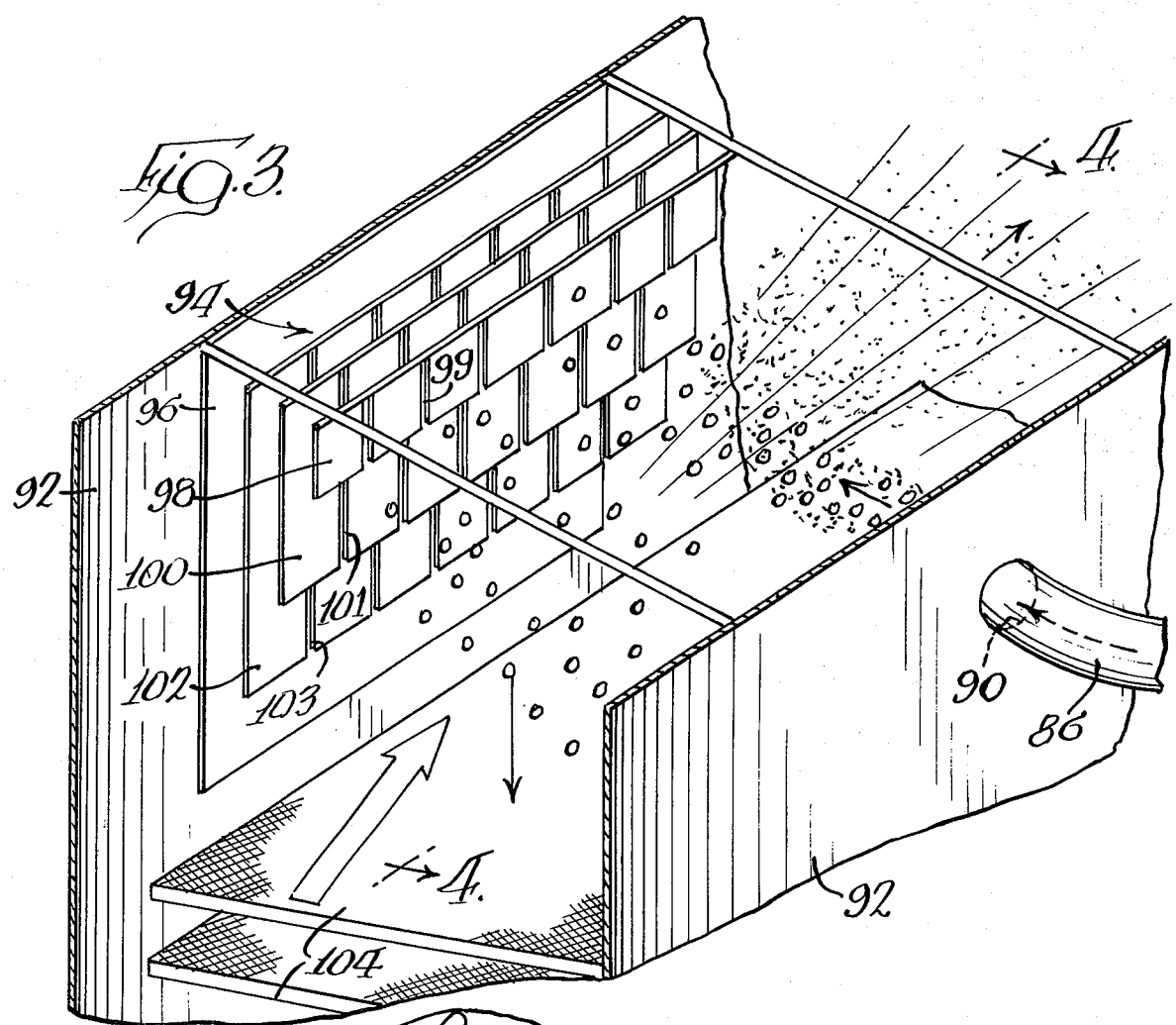
FIG. 3 is an enlarged perspective view with parts broken away of the air-cleaning part of the inside of the combine.

Referring to the drawings and, in particular, to FIG. 1, a combine 10 is shown and comprises a self-propelled power unit 12, a cutter platform 14 and a vacuum pick up floating row cover 16 suspended between the power unit 12 and the cutter platform 14. For illustration purposes, the cutter platform 14 is shown moved forward of its regular position relative to the combine 10 so that the floating row cover 16 can be seen in position partially beneath the rear portion of the cutter platform 14. The power unit 12 and cutter platform 14 are conventional pieces of equipment connected together by means of a coupling and conveyor system acting through the tunnel 18 extending from the cutter platform to the power unit.

The combine 10 could be a John Deere, Model 7700, combine with the power unit 12 having a chassis 20, four wheels 22 mounted on the chassis, an engine 24, an operator cab 26 and a hopper 28. Within the chassis is a well-known bean or grain processing apparatus which receives grain and stalks, or soybean branches, leaves and pods from the cutter platform through the tunnel 18. In the processing apparatus, the grain or beans are separated from their coverings, chaff and stalks or branches, leaves and pods, respectively, and the grain or beans are conveyed by the augers 30 to the cleaning screen, chaffer and sieve area 32. The final cleaned grain or beans migrate to the transverse auger 34 where it is moved to the lift conveyor 36 for movement upward into the hopper 28 where it is stored until moved into a truck for transport to a storage area.

My improved floating row cover 16 is positioned between the cutter platform 14 and the power unit 12 by means of the fixed arms 38,40 welded or bolted to the sides of the cutter platform which arms support chains 42,44 connected to brackets 46,48 on the rear portion of the row cover 16. Bolts 50 extend between the cutter platform 14 and the front portion of the row cover 16 and are used for front pivoting of the cover on platform 14. It can be seen that the height of the row cover 16 can be varied relative to the ground by lengthening or shortening the chains 42,44.

The row cover 16 is an elongate housing 52 which has a top portion 54 and tapered rearward and forward extending walls 56,58 joined on each end to end walls 60,62. The rearward tapered or angled wall 56 has a plurality of equally spaced apart openings 64 into each one of which is fitted a rubber flap 66 having an inverted V-shaped slot 68 with the open end of the "V" terminating at the rearward edge of said flap 66. As shown in FIG. 2A, the forward wall 58 is shorter than wall 56 and is intended to ride just over the tops of the peaks of the hills forming the planted rows of grain or beans with the longer V-shaped slotted rear wall 56 being disposed with the row hills aligning with the V-shaped openings 68. The flaps 66 in the rear wall 56 have slots 70 formed therethrough in such a way that means can be inserted in said slots for adjusting the flaps 66. An elongate dome 72 is secured to the top portion 54 of the row cover and has two nipples 74 projecting upwardly therefrom for connection to the ends of flexible conduits 76,78. Openings 80 are formed through the top portion 54 of the row cover into communication with the interior of the dome 72. The entire bottom of the row cover is open.

The conduits 76,78 pass around the tunnel 18 and are supported along one side of the chassis of the power unit and are connected to the inlet 82 of the blower 84 mounted on the chassis of the power unit. The blower 84 is driven either by a chain, a pulley 85 off the engine 24 or by a direct drive gasoline motor mounted to the rear of the power unit 12 and the blower 84. A conduit 86 is connected from the outlet 88 of the blower 84 and is connected in alignment with an opening 90 in the side wall 92 of the corn, grain or bean processing apparatus.

Up to this point, it can be seen that the blower 84 draws air from the dome 72 and row cover 16 through the conduits 76,78 creating a vacuum in the row cover that draws any loose grain or beans that are on the ground between or on the spaced hills of the field. Obviously, the suction is going to also draw up leaves, twigs, loose dirt and other loose debris that is on the ground. The grain or beans, together with the loose debris, will be drawn through the openings 80 in the row cover through the dome 72, through the conduits 76,78, through the blower 84 and out the conduit 86 and blown through the opening 90 in the wall 92 of the processing apparatus.

Figure 4:
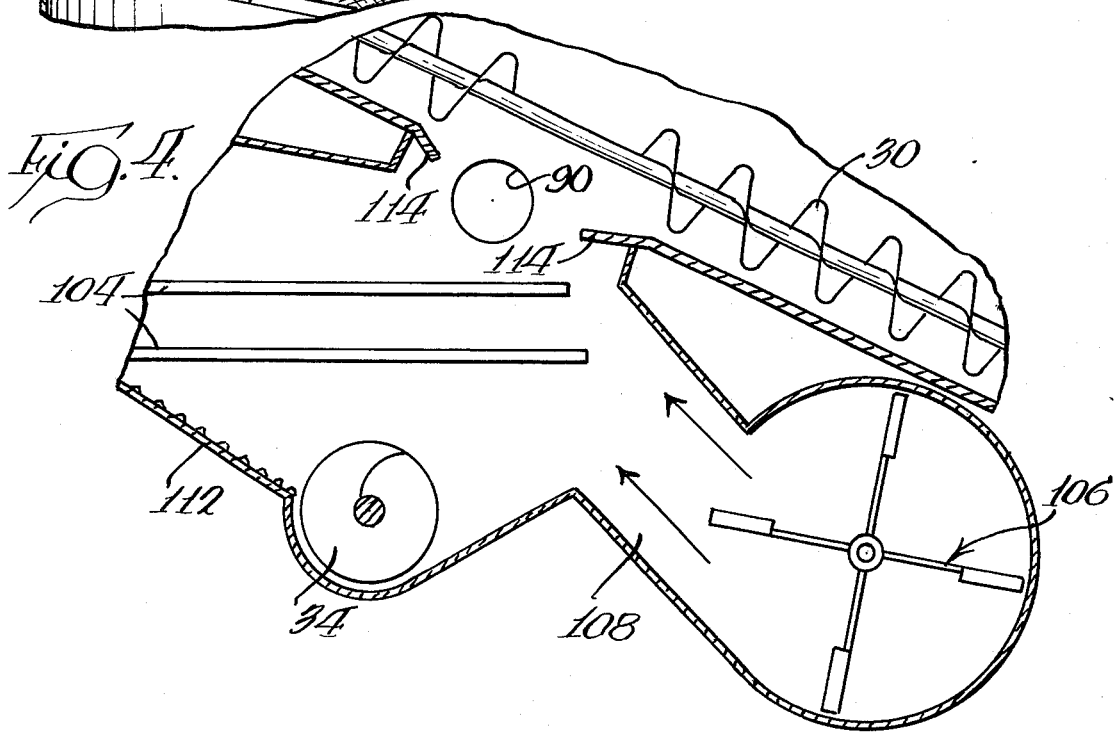
FIG. 4 is an enlarged cross-sectional view of the inside of the combine taken along the line 4—4 of FIG. 3.

To separate the debris from the grain or beans, FIGS. 3 and 4 show a plurality of baffles 94 mounted in the chamber of the chassis in alignment with the incoming mixture of grain or beans and debris. That is, a backing baffle 96 is mounted on the inside of the wall opposite to the opening 90, with a first, second and third baffle 98, 100, 102, respectively, spaced from said backing baffle and from each other in the path of movement of material propelled into the chamber. The first baffle 98 is relatively short and is slotted vertically at 99 from the hanging end of said baffle. The second baffle 100 is about twice as long as said first baffle and is spaced rearward from said first baffle. Said second baffle is likewise slotted vertically at 101 from the hanging end of said baffle. The third baffle 102 is longer than the second baffle and is slotted vertically at 103 from its hanging end. The third baffle is spaced from the second baffle and from said backing baffle 96.

Below said baffles 96, 98, 100 and 102 and extending rearward from the opening 90 is one or more screens or sieves 104. The screens 104 are mounted to gyrate the materials that land thereon along the screen toward discharge on to the sloped bottom 112 of the chamber and into the auger 34. A scroll fan 106 is mounted in the chamber of the chassis with an outlet 108 of the fan directed at an angle toward and through the screens 104 and across the incoming path of grain or beans and debris from the conduit 86 at substantially a right angle. The fan 106 generates a jet or rifle shot blast of air out said outlet 108. The fan 106 is driven by a belt or chain connected to a power takeoff from the engine 24.

The grain or beans and the debris are blown through opening 90 into the chamber and across the jet or rifle shot blast of air from the fan 106 whereupon the lighter debris or tailings will be blown along the chamber and out the discharge opening 110 at the rear of the chassis. The grain or beans and the heavier debris or tailings will variously strike the different baffles 96, 98, 100, 102 with the grain or beans dropping down onto the vibrating screens 104 as the jet or rifle shot stream of air carries off additional chaff or debris. Some debris will break up when it strikes the baffles and will be carried off by the stream of air. Some of the remaining debris, such as small clumps of dirt, will land on the screens with the grain or beans, and as the screens are vibrated and as the airstream blows up through the screens, the clumps of dirt will generally break up whereupon the airstream will carry off the pieces. The grain or beans will eventually fall off the end of the screens 104 and will migrate down the sloped bottom wall 112 of the chamber into the auger 34 where it will be carried to the elevator and into the storage hopper on the power unit 12.

Simultaneously with the inflow of grain or beans and debris into the chassis through opening 90, the grain or beans and minor chaff and tailings from the primary harvester are fed by the augers 30 to the sloped opening 114 where the grain or beans and chaff and tailings fall through the jet or rifle shot stream of air to carry off said chaff and tailings and land on the vibrating screens 104. The grain or beans from the primary harvesting mechanism merge or mingle with the grain or beans from the secondary or vacuum pick up harvesting mechanism as both fall or are propelled through the jet or rifle shot stream of air and once on the screens 104, the grain or beans are co-mingled for the final air cleaning and movement to storage.

I claim:

1. In a combine for harvesting a kernal-type product, a power unit having a chassis with product processing apparatus therein, a cutter platform mounted on the front of said power unit, means for conveying product from said cutter platform into said processing apparatus, in combination, a floating row cover mounted on said cutter platform between said platform and said power unit, means mounted on said chassis for creating a suction under said row cover to draw up loose product from the ground, and means in said processing apparatus for separating debris from said loose product.

2. In a combine as claimed in claim 1 wherein said floating row cover is adjustable relative to the ground so as to be positioned for maximizing suctioning up of loose product from the ground.

3. In a combine as claimed in claim 2 wherein said row cover is dome-shaped and has inverted V-slots in the rear wall for conforming to the contour of the field to further maximize suctioning of loose product.

4. In a combine as claimed in claim 1 wherein the suctioned product is blown into an open area in said chassis and fan means on said chassis is provided for directing a jet stream of air across the path of said product to separate lighter weight debris from the product.

5. In a combine as claimed in claim 4 wherein a vibrating screen spans the open area of the chassis below said blown in product, said jet stream of air, at least in part, blows at an angle upwardly through said screen, a plurality of staggered baffles are mounted in said chassis in alignment with the path of said incoming suctioned product and above said screen so that said product and the heavier debris will strike said baffles with the product being deflected onto said screen and with a portion of said heavier debris breaking up and being carried off in said jet stream of air.

6. A combine for harvesting soybeans, a power unit having a frame upon which is mounted a chassis, a cutter platform mounted on the front of said power unit, means for conveying soybeans, stalks and leaves from said cutter platform into said chassis, means in said chassis for separating said soybeans from the stalks and leaves, said separating means including fan means on said chassis for blowing a jet of air through said soybeans, stalks and leaves for blowing off loose stalks and leaves, means for feeding said separated soybeans into a storage bin on said chassis, a floating row cover mounted on said cutter platform between said platform and said power unit, means mounted on said chassis for creating a suction under said row cover for drawing up loose soybeans and incidental loose debris from the ground, and said suction means propelling said loose soybeans and debris into the path of said jet of air from said fan means for separating the debris from said loose soybeans whereby said loose soybeans mingle with said initial soybeans for movement into said storage bin.

7. A combine as claimed in claim 6 wherein means are provided for raising and lowering said row cover relative to the ground for varying the effective degree of suction.

8. A combine as claimed in claim 6 wherein said row cover has flexible flaps on the rear wall thereof, inverted V-shaped slots formed in each flap to generally conform to the contour of a bean row hill so that the row cover can be set lower to generally conform to the ground contour to improve the amount of suction available for picking up the beans.

9. A harvesting mechanism for grain having a power unit with a chassis, a cutter platform and a primary grain cutter mounted on the front of said power unit, means for conveying grain from said cutter into said chassis, a floating row cover mounted on said cutter platform between said cutter and said power unit, means mounted on said chassis for creating a suction under said row cover to draw up loose grain from the ground, and fan means on said chassis for blowing air across the path of said grain for separating debris from said grain.

* * * * *